United States Patent [19]

Livingston

[11] Patent Number: 4,838,575

[45] Date of Patent: Jun. 13, 1989

[54] IMPACT HEAD REST DEVICE FOR VEHICLE WINDOW

[76] Inventor: Michael F. Livingston, 21362 Fleet La., Huntington Beach, Calif. 92646

[21] Appl. No.: 132,016

[22] Filed: Dec. 14, 1987

[51] Int. Cl.⁴ .............................................. B60R 21/02
[52] U.S. Cl. ...................................... 280/748; 297/395
[58] Field of Search ................ 280/748, 751; 297/391, 297/395, 410

[56] References Cited

U.S. PATENT DOCUMENTS

| | | | |
|---|---|---|---|
| 3,762,505 | 10/1973 | Morse | 280/748 |
| 3,851,919 | 12/1974 | Nagy | 297/395 |
| 4,607,886 | 8/1986 | Mazhar | 297/395 |

FOREIGN PATENT DOCUMENTS 2145499  3/1973  Fed. Rep. of Germany ...... 280/748

*Primary Examiner*—Charles A. Marmor
*Assistant Examiner*—Ross Weaver
*Attorney, Agent, or Firm*—Willie Krawitz

[57] ABSTRACT

An impact head rest device is provided for a vehicle window. The head rest device comprises a vertically adjustable support column which includes narrow-shaped end members that fit behind or into the window molding. The support column is moveable about midway along its length from a slightly bent position to the straight column position.

This enables the device to be inserted at each end behind the upper and lower window moldings in the bent position. Upon straightening the device by moderate pressure, the support column will be firmly wedged between the window moldings and the glass portion of the window, and thereby be secured in place.

14 Claims, 3 Drawing Sheets

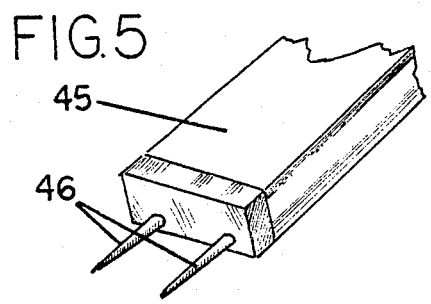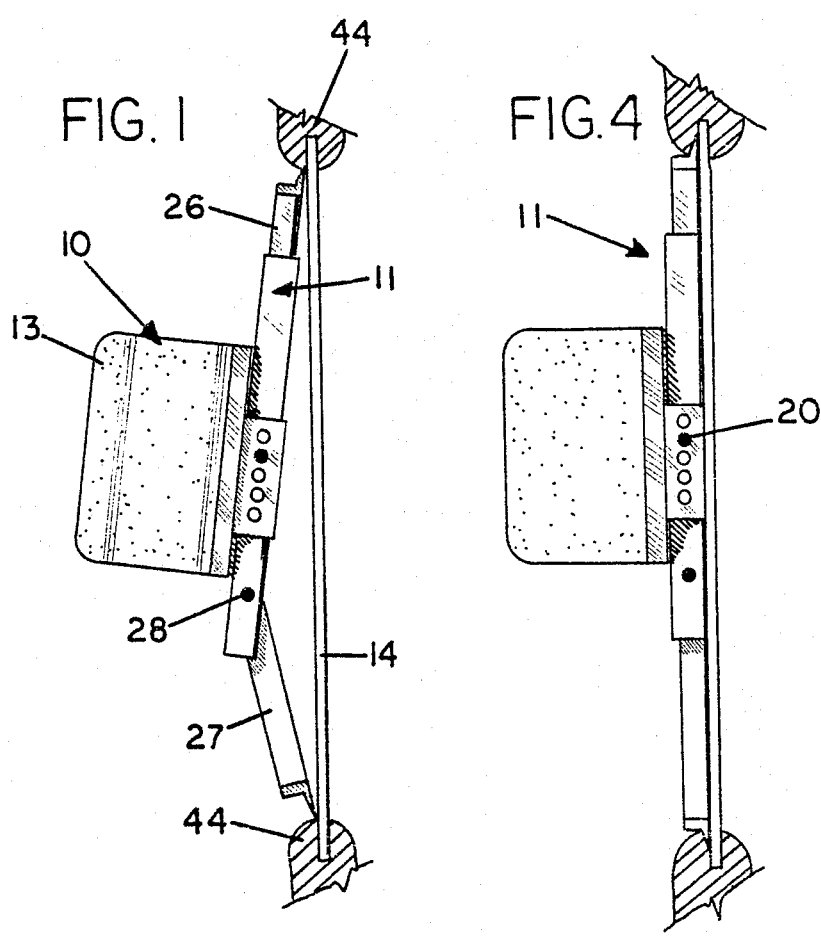

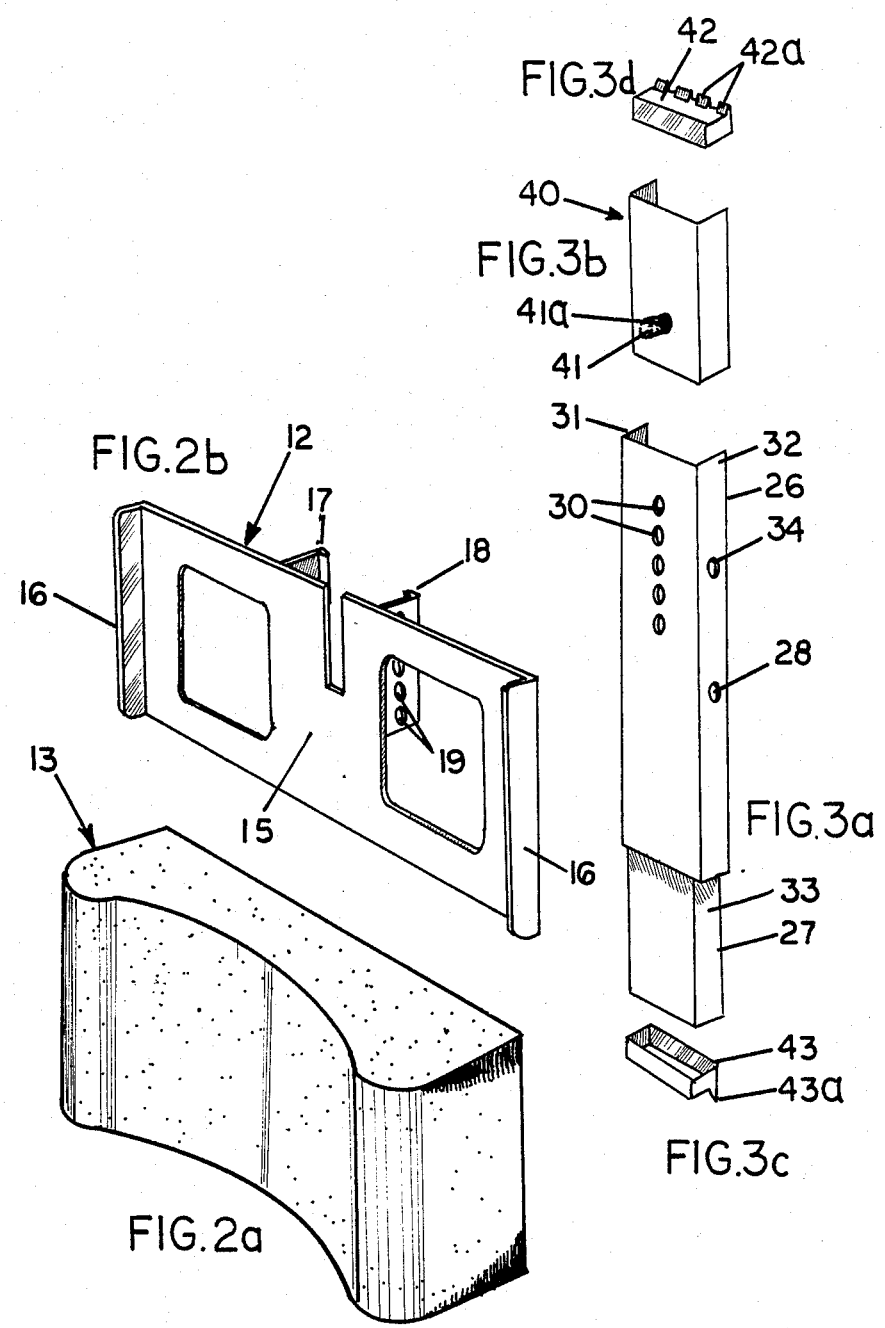

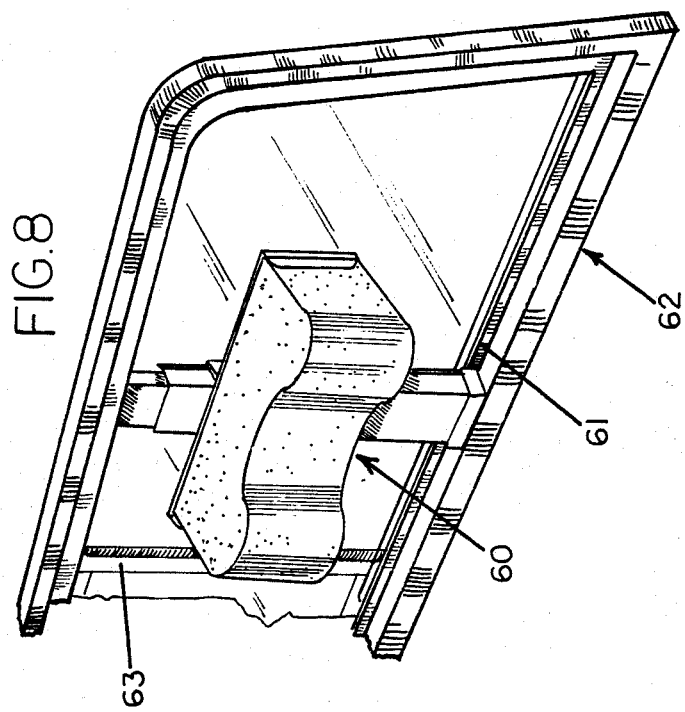
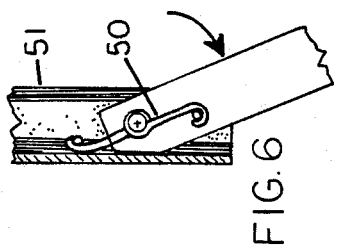
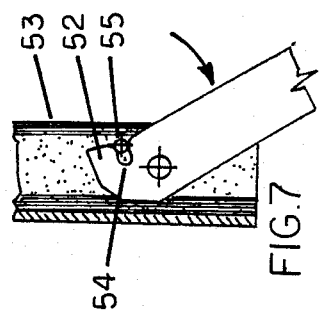

IMPACT HEAD REST DEVICE FOR VEHICLE WINDOW

BACKGROUND OF THE INVENTION

This invention relates to a new and improved head protector which may be inserted into or in between the moldings of the window of a vehicle. While the device may be employed as part of a new vehicle, it is primarily intended as a replacement or retrofit on an existing vehicle.

In these vehicles, particularly in many of those later models having small cab fronts, the driver's head is positioned in close proximity to the rear window. Consequently, in case of a sudden stop, front or rear impact, or even sudden rear movement of the driver or passenger, the individual's head could impact on the rear window in the absence of some form of protective device.

It is therefore an object of this invention to provide a new and improved rear head support for a driver or passenger in a vehicle, where the driver or passenger are positioned in close proximity to a rear window in the vehicle.

A further object is to provide an inexpensive rear head support which may be easily installed and removed in the window of a vehicle which can be accommodated to various window sizes and irrespective of the type of window molding.

A further object is to provide a rear head support in the window of a vehicle which may easily be retrofitted by a user without requiring factory installation, or skilled labor.

THE INVENTION

According to the invention, there is provided a head cushian support suitable for installation in the window frame of a vehicle. The head cushion support comprises a cushion support tray upon which the head cushion is carried, the cushion support itself being mounted on a vertically adjustable locking column. The locking column includes a medially disposed, locking joint and end members which are adapted to fit behind the window frame of a vehicle. A telescoping, adjustment piece is provided to extend or shorten the length of the locking column, and this adjustment piece enables the locking column to be properly sized for any given window.

When the locking column is sized for installation, it is bent inwardly at the locking joint, and the end members are inserted behind the window frame. The locking joint is then manually depressed to straighten and lock the column into position along the window. The support tray and attached head cushion may be installed in the support column prior to, or subsequent to installation of the support column on the window.

BRIEF DESCRIPTION OF THE DRAWINGS

FIG. 1 is an external view, in side elevation, showing the device partly installed, and just prior to final installation;

FIGS. 2a and 2b are exploded, external, perspective views of the head cushion support and support tray;

FIGS. 3 (a–d) are exploded, external, perspective views of the locking column;

FIG. 4 is an external view in side elevation showing the head cushion mounted on the support tray;

FIG. 5 is an external, perspective view showing another embodiment of an end cap for the locking column;

FIG. 6 is an external view in side elevation showing a spring-loaded attachment for producing a locking-unlocking action for the locking column;

FIG. 7 is an external view in side elevation showing a cam action attachment for producing a locking-action for the locking column; and, FIG. 8 is an external view, in perspective, showing another embodiment of the invention installed in a window, including a sliding portion.

DESCRIPTION OF THE PREFERRED EMBODIMENTS

The impact head rest device 10 of this invention is shown in FIG. 1, and comprises a locking column 11, cushion support tray 12 attached to the locking column, and a head cushion 13 secured to the support tray. The locking column 11 is shown mounted on the window 14 of a vehicle.

As shown in FIGS. 2a and 2b, the support tray 12 comprises a flat base portion 15 on which the head cushion 13 is mounted, and secured under compression between upstanding side flanges 16, 16. If desired, the cushion, which is typically constructed of foam rubber, may additionally, or in the alternative, be secured to the base portion by velcro, and adhesive, etc. The rear portion of the support tray 12 provides flange elements 17, 18 which are adapted to engage and slide along the locking column 11.

A plurality of spaced holes 19 are defined along flange element 18 of the support tray through which a bolt 20 may be inserted to engage with a hole on the support column. This arrangement enables the support tray 12 and attached head cushion 11 to be adjusted to the height of the driver or passenger.

The locking column 11, shown in FIGS 3 (a–d) provides two interengaging upper and lower joint components 26 and 27, respectively, which are pivoted about a pivot pin 28.

The upper joint component 26 provides a bore portion 29, bearing a plurality of bore holes 30, and outer flange members 31, 32 which interfit with corresponding flange members, one member 33 being shown. The flange members 31, 32 also interfit with the flange elements 17, 18 of the support tray 12. A bore hole 34 is defined on flange 32 through which the bolt 20 is passed in order to position the support tray 12.

A telescoping element 40 is provided to engage and slide along the locking column 11; this provides an adjustable length for purposes of installation. A bolt 42 is passed through a bore hole 41 on the telescoping element 40, and into one of the bore holes 30 of the joint component 36 to obtain a suitable length of locking column. End caps 42, 43 with serrated or flat edges 42a, 43a are mounted on the ends of the locking column for fitting behind the window frames 44, 44 of the window 14.

Another type of end cap 45 is shown in FIG. 5 and provides prong elements 46 for penetrating a window molding, where the window is manufactured of rubber, soft plastic, wood, etc., or where a rubber molding is of insufficient size to accommodate the end caps.

Another embodiment of this invention is shown in FIG. 6, which illustrates a spring loaded attachment 50 for producing a locking-unlocking action of a locking column 51. In FIG. 7, a cam action attachment 52 is shown for producing the locking-unlocking action of a locking column 53 to effect insertion behind the window frame. The cam attachment 52 includes a slot 54 which fits into a pin 55 to effect a locking-unlocking action.

FIG. 6 illustrates another embodiment of this invention in which the head rest device 60 is mounted behind a window frame 61, of a window 62. In this instance, the window includes a sliding portion 63, rather than being the single pane variety 14, as shown in FIG. 1.

Thus, the head rest device of this invention is easily adapted to fit into various types and sizes of windows, and may employ different types of locking columns and different window frame engaging means without departing from the spirit of the invention.

I claim:

1. An impact head rest device for a vehicle window, comprising:
   (a.) a support column moveable about midway along its length from a slightly bent, unlocked position to a straight, locked column position;
   (b.) end cap members mounted at each end of the support column, the end cap members providing prong element end means for fitting between a window and an associated frame of the vehicle window;
   (c.) a cushion support tray mounted on the support column; and,
   (d.) a head cushion mounted on the support tray; whereby:
      i. when the support column is in the bent and unlocked position, the prong element end means of the end cap members are insertable between the window frame and the window;
      ii. when the support column is moved by compression from the unlocked position to the straight, locked position, the prong elements will be forced between the window and window frame, thereby maintaining the support column locked and wedged entirely along the window; and,
      iii. the head cushion will provide a stationary protection and impact support between a driver's head and the window.

2. The impact head rest device of claim 1, including a length adjustment member mounted on the support column.

3. The impact head rest device of claim 2, in which the cushion support tray is adjustably mounted on the support column.

4. The impact head rest device of claim 1, in which the support column includes interengaging upper and lower joint components pivoted about a pivot pin for movement of the support column from a bent and unlocked position to a straight and locked position.

5. The impact head rest device of claim 1, in which the support column includes interengaging upper and lower joint components and provides cam action means for effecting locking and unlocking movement of the support column.

6. The impact head rest device of claim 1, in which the support column includes interengaging upper and lower joint components and provides spring loaded means for effecting locking and unlocking movement of the support column.

7. An assembly of an impact head rest device and a window of a vehicle, comprising:
   (a.) a vehicle window, including a window frame;
   (b.) a support column moveable about midway along its length from a slightly bent, unlocked position to a straight, locked column position;
   (c.) end cap members mounted at each end of the support column, the end cap members providing prong element end means for fitting between the window and the window frame of the vehicle window;
   (d.) a cushion support tray mounted on the support column; and,
   (e.) a head cushion mounted on the support tray; whereby:
      i. when the support column is in the bent and unlocked position, the prong element end means of the end cap members are insertable between the window frame and the window;
      ii. when the support column is moved by compression from the unlocked position to the straight, locked position, the prong elements will be forced between the window and the window frame, thereby maintaining the support column locked and wedged entirely along the window; and,
      iii. the head cushion will provide a stationary protection and impact support between a driver's head and the window.

8. The assembly of claim 7, including a length adjustment member mounted on the support column.

9. The assembly of claim 7, in which the cushion support tray is adjustably mounted on the support column.

10. The assembly of claim 9, in which the support column includes interengaging upper and lower joint components pivoted about a pivot pin for movement of the support column from a bent and unlocked position to a straight and locked position.

11. The assembly of claim 9, in which the support column includes interengaging upper and lower joint components and provides cam action means for effecting locking and unlocking movement of the support column.

12. The assembly of claim 9, in which the support column includes interengaging upper and lower joint components and provides spring loaded means for effecting locking and unlocking movement of the support column.

13. The assembly of claim 7, in which the end means of the end cap members are adapted to penetrate the window frame.

14. A method for inserting an impact head rest device onto a vehicle window, the head rest device comprising:
   (a.) a support column moveable about midway along its length from a slightly bent, unlocked position to a straight, locked column position;
   (b.) end cap members mounted at each end of the support column, the end cap members providing prong element end means for fitting between a window and an associated frame of the vehicle window;
   (c.) a cushion support tray mounted on the support column; and,
   (d.) a head cushion mounted on the support tray; the method comprising: bending the support column into the unlocked position and inserting the prong element end means of the end cap members between the window frame and the window, compressing the support column from the bent and unlocked position to the straight, locked position, thereby forcing the prong element end means between the head rest device and the window frame, thereby maintaining the support column locked and wedged entirely along the window and providing a stationary protection and impact support between a driver's head and the window.

* * * * *